United States Patent
Chen

(10) Patent No.: US 8,797,927 B2
(45) Date of Patent: Aug. 5, 2014

(54) RF CIRCUIT SYSTEM AND METHOD OF INCREASING THE ISOLATION BETWEEN TWO WIRELESS COMMUNICATIONS STANDARDS WITHIN AN RF CIRCUIT SYSTEM

(71) Applicant: Wistron NeWeb Corp., Hsinchu County (TW)

(72) Inventor: Yung-Jinn Chen, Hsinchu County (TW)

(73) Assignee: Wistron Neweb Corp., Hsinchu County (TW)

( * ) Notice: Subject to any disclaimer, the term of this patent is extended or adjusted under 35 U.S.C. 154(b) by 101 days.

(21) Appl. No.: 13/709,861

(22) Filed: Dec. 10, 2012

(65) Prior Publication Data
US 2013/0315116 A1 Nov. 28, 2013

(30) Foreign Application Priority Data
May 23, 2012 (TW) .............................. 101118366 A

(51) Int. Cl.
*H04L 5/00* (2006.01)
*H04B 1/44* (2006.01)

(52) U.S. Cl.
CPC ... *H04B 1/44* (2013.01); *H04L 5/00* (2013.01)
USPC ........................................................ 370/297

(58) Field of Classification Search
USPC ............... 370/278, 280, 297; 455/7, 41.2, 78, 455/226.1; 379/283
See application file for complete search history.

(56) References Cited

U.S. PATENT DOCUMENTS

| 6,115,464 | A | * | 9/2000 | Lester et al. .................. 379/283 |
| 7,844,216 | B2 | * | 11/2010 | Cleveland et al. ................ 455/7 |
| 7,855,983 | B2 | * | 12/2010 | Knecht et al. ................. 370/280 |
| 8,219,056 | B2 | * | 7/2012 | Sundstrom et al. ........ 455/226.1 |
| 8,457,559 | B2 | * | 6/2013 | Gao et al. ..................... 455/41.2 |
| 8,660,041 | B2 | * | 2/2014 | Niskanen et al. ............. 370/278 |
| 2006/0128322 | A1 | * | 6/2006 | Igarashi et al. ................. 455/78 |

FOREIGN PATENT DOCUMENTS

WO    WO 2008156760 A1 * 12/2008 ............... H04B 1/44

OTHER PUBLICATIONS

Adaptive SINR Threshold Allocation for Joint Power Control and Beamforming Over Wireless Networks, Zhu Han and K.J. Ray Liu, 2001 IEEE.*

\* cited by examiner

*Primary Examiner* — Mark Rinehart
*Assistant Examiner* — Gbemileke Onamuti
(74) *Attorney, Agent, or Firm* — Blakely Sokoloff Taylor & Zafman

(57) ABSTRACT

An RF circuit system comprises a processing unit for generating an RF signal, a first antenna for transmitting the RF signal, a transmitting suppressor including serially connected filters between the first antenna and the processing unit for filtering the RF signal to generate multiple different suppressed RF signals, a second antenna for receiving the RF signal, and an isolation detector for measuring an isolation value representing isolation between the first and second antennae with respect to the RF signal. The transmitting suppressor outputs the RF signal when the isolation value is not smaller than a threshold, and outputs one suppressed RF signal with reference to the difference between the isolation value and the threshold when otherwise.

15 Claims, 10 Drawing Sheets

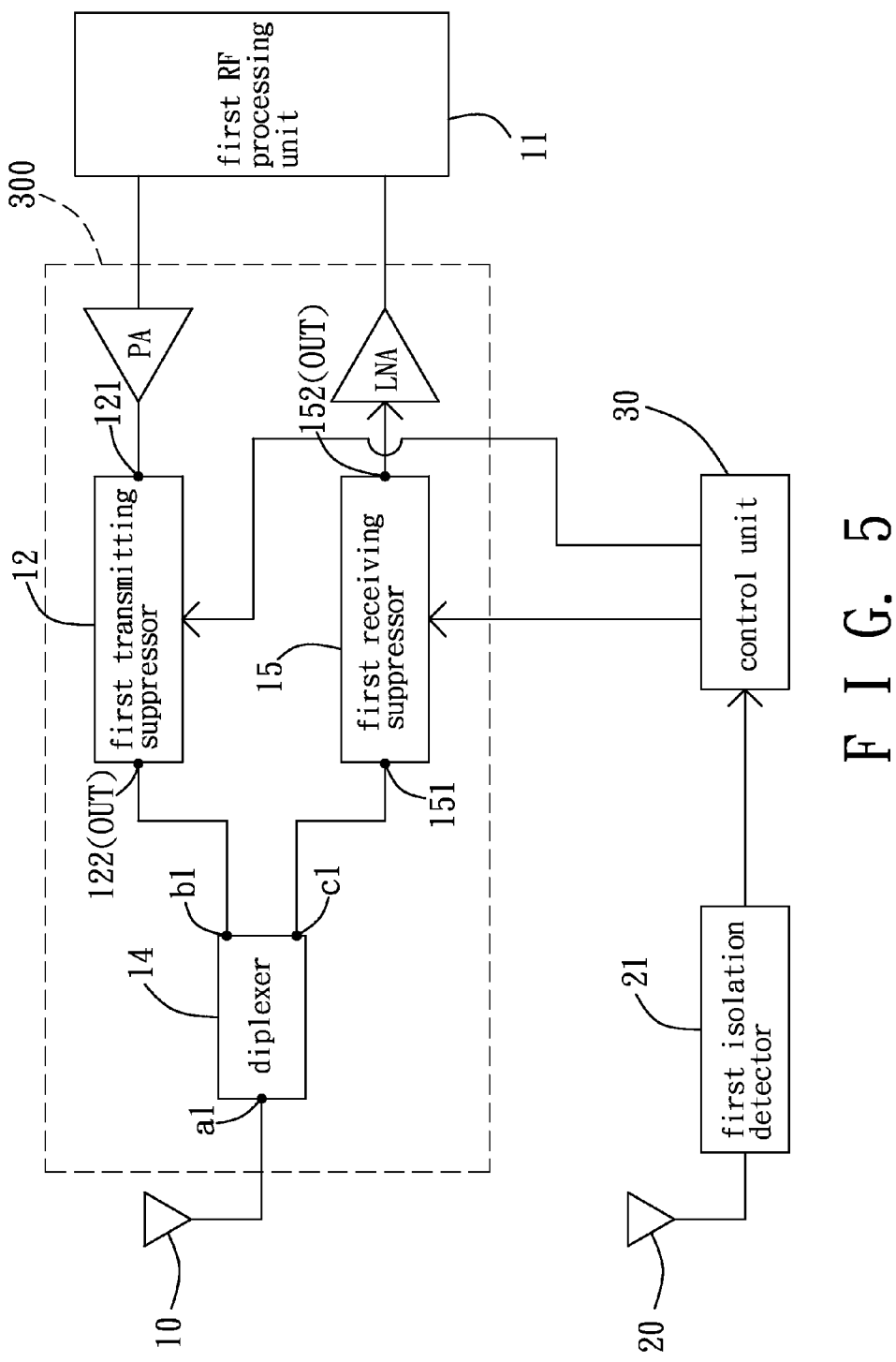
F I G. 5

RF CIRCUIT SYSTEM AND METHOD OF INCREASING THE ISOLATION BETWEEN TWO WIRELESS COMMUNICATIONS STANDARDS WITHIN AN RF CIRCUIT SYSTEM

CROSS-REFERENCE TO RELATED APPLICATION

This application claims priority of Taiwanese Application No. 101118366, filed May 23, 2012.

BACKGROUND OF THE INVENTION

1. Field of the Invention

The invention relates to a wireless communications circuit, more particularly to a radio frequency (RF) circuit system and a method for increasing isolation between two wireless communications standards within an RF circuit system.

2. Description of the Related Art

Because of the market's increasingly advanced requirements for wireless communications devices, many terminalable wireless communications devices, such as smart phones, have been integrated with multiple communications standards, such as WiFi, EDGE, HSPA, EV-DO, LTE, or Bluetooth. However, the space available for internal circuitry is limited. Since the hardware for these different wireless communications standards are in proximity to each other, the isolation between these standards is often insufficient, thus creating interference amongst themselves.

As shown in FIG. 1, when two wireless communications modules 100, 200, such as LTE and WiFi, are integrated into a single wireless communications device, the distance and isolation between the two wireless communications modules 100, 200 become fixed. Thus, the schematics of the wireless communications device itself could create insufficient isolation (both circuit isolation and antenna isolation) between the two wireless communications modules 100, 200. In this case, when the wireless communications modules 100, 200 are simultaneously in operation within the same wireless communications device, interference between the wireless communications modules 100, 200 could diminish the functionalities of one or both of the wireless communications modules 100, 200. When the operating band for an RF module 101 for the wireless communications module 100 overlaps with the operating band of the wireless communications module 200, the side lobes of a signal transmitted using the wireless communications module 100 could interfere with at least part of the operating band of the wireless communications module 200, and typically the wireless communications module 200 is unable to adjust around the interference, thus hindering its the ability to function.

SUMMARY OF THE INVENTION

Therefore, the object of the present invention is to provide a method for improving the isolation within a wireless communications device integrated with at least two wireless communications standard and to provide an radio frequency (RF) circuit system for implementing the method.

To this end, the present invention provides an RF circuit system and a method for improving isolation within a wireless communication device by selectively filtering RF signals to eliminate unnecessary and interfering frequencies.

Accordingly to one aspect of the present invention, the RF circuit system includes a first antenna, a first RF processing unit capable of generating a first RF signal, a first transmitting suppressor, a second antenna, a first isolation detector, and a control unit.

The first transmitting suppressor includes a plurality of serially connected filters that are electrically coupled between the first antenna and the first RF processing unit for receiving the first RF signal from the first RF processing unit and for filtering the first RF signal thus received to generate a plurality of different first suppressed RF signals respectively at output nodes of the filters. The first transmitting suppressor is capable of outputting one of the first RF signal and the first suppressed RF signals for subsequent transmission by the first antenna.

The second antenna is capable of receiving the first RF signal transmitted by the first antenna.

The first isolation detector is electrically coupled to the second antenna for measuring a first isolation value representing the isolation between the first and second antennae with respect to the first RF signal.

The control unit is electrically coupled to the first isolation detector and the first transmitting suppressor for receiving the first isolation value and determining whether the first isolation value is not smaller than a predetermined threshold.

When it is determined that the first isolation value is not smaller than the predetermined threshold, the control unit controls the first transmitting suppressor to subsequently output the first RF signal for transmission by the first antenna. When it is determined that the first isolation value is smaller than the predetermined threshold, the control unit further determines a difference between the first isolation value and the predetermined threshold and controls the first transmitting suppressor to subsequently output, for transmission by the first antenna, the first suppressed RF signal generated at the output node of one of the filters of the first transmitting suppressor as determined by the control unit with reference to the difference between the first isolation value and the predetermined threshold.

According to another aspect of the present invention, there is provided a method for increasing isolation between two wireless communications standards within a radio frequency (RF) circuit system. The RF circuit system includes a first antenna, a first RF processing unit that is capable of generating a first RF signal for subsequent transmission by the first antenna, and a second antenna capable of receiving the first RF signal. The method includes the steps of:

(A) providing a first transmitting suppressor that includes a plurality of serially connected filters to be electrically coupled between the first antenna and the first RF processing unit for receiving the first RF signal from the first RF processing unit and for filtering the first RF signal thus received to generate a plurality of different first suppressed RF signals respectively at output nodes of the filters, and further providing a control unit to be electrically coupled to the first transmitting suppressor;

(B) providing a first isolation detector to be electrically coupled to the second antenna for measuring a first isolation value representing the isolation between the first and second antennae with respect to first RF signal, and to the control unit for providing the first isolation value to the control unit;

(C) configuring the control unit to determine whether the first isolation value is not smaller than a predetermined threshold; and (D) when it is determined that the first isolation value is not smaller than the predetermined threshold, configuring the control unit to control the first transmitting suppressor to subsequently output the first RF signal for transmission by the first antenna, and when it is determined that the first isolation value is smaller than the predetermined threshold, configuring the control unit to control the first transmitting suppressor to subsequently output, for transmission by the first antenna, the first suppressed RF signal generated at the output node of one of the filters of the first transmitting suppressor as determined by the control unit with reference to a difference between the first isolation value and the predetermined threshold.

In sum, by providing a transmitting suppressor and a receiving suppressor between an RF processing unit and a first antenna, by providing an isolation detector to be electrically coupled to a second antenna in proximity of the first antenna, and by transmitting a specific signal via the first antenna to be received by the second antenna for measurement of the isolation between the first and second antennae with respect to that specific signal, the measured isolation may be used as a basis for controlling the transmitting suppressor and the receiving suppressor in terms of the degree to filter, or suppress, signals to be transmitted via the first antenna or signals to be received via the first antenna so as to ensure that a desirable isolation is achieved between the first and second antennae.

BRIEF DESCRIPTION OF THE DRAWINGS

Other features and advantages of the present invention will become apparent in the following detailed description of the preferred embodiments with reference to the accompanying drawings, of which:

FIG. 5 is a schematic block diagram of an RF circuit system according to the second embodiment of this invention;

DETAILED DESCRIPTION OF THE PREFERRED EMBODIMENTS

Figure 1:
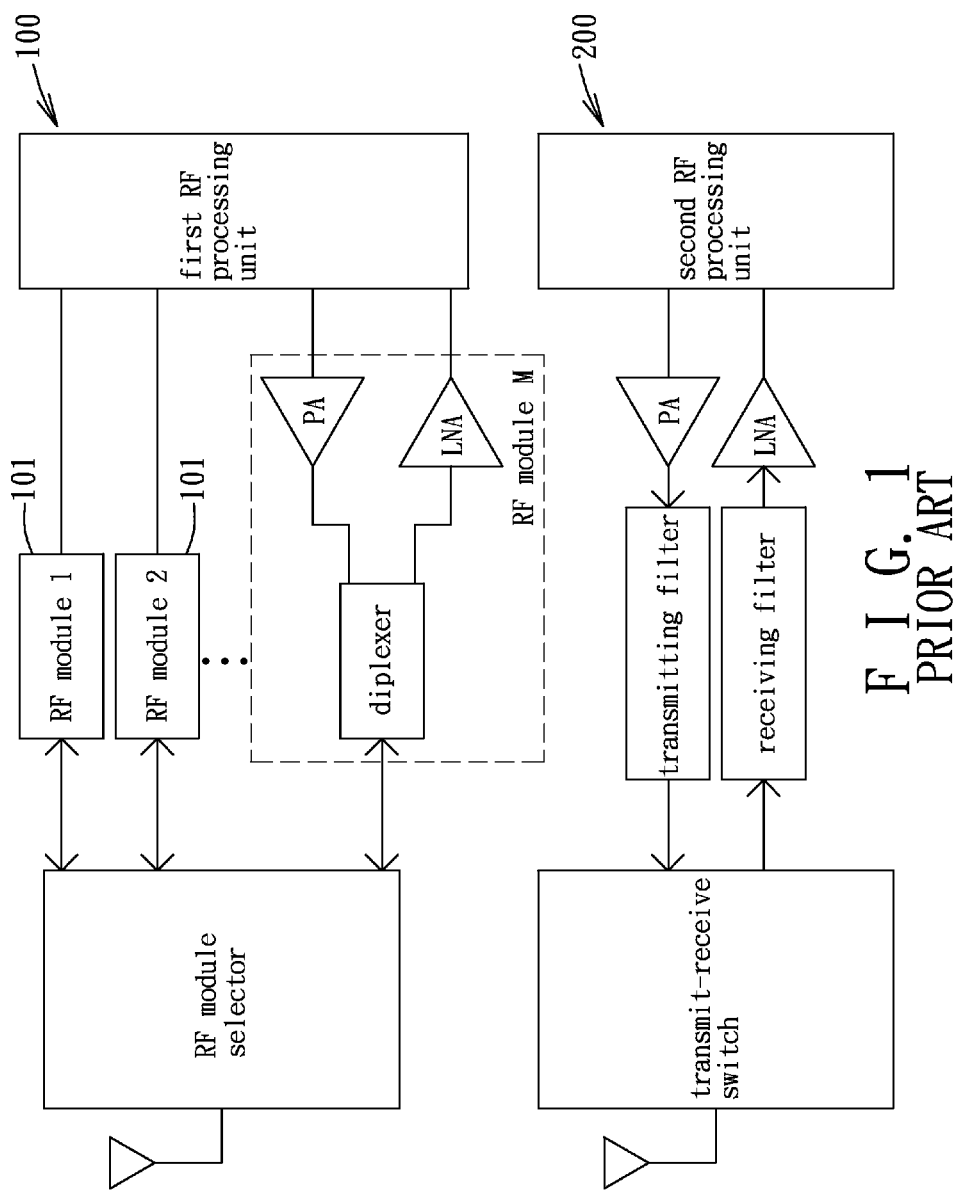
FIG. 1 is a schematic circuit block diagram depicting the framework for two wireless communications standards within a conventional wireless communications device.

Before the present invention is described in greater detail, it should be noted that like elements are denoted by the same reference numerals throughout the disclosure.

Figure 2:
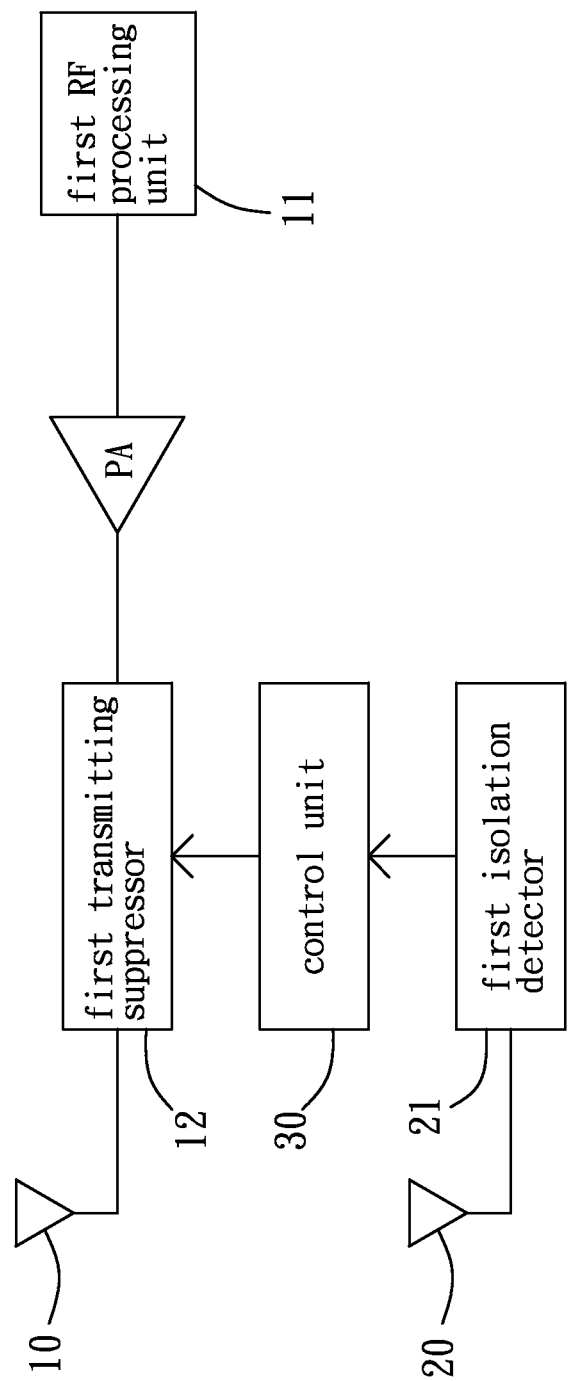
FIG. 2 is a schematic block diagram of an RF circuit system according to a first embodiment of this invention.

As shown in FIG. 2, according to a first embodiment of this invention, an RF circuit system includes a first antenna 10, a first RF processing unit 11, a first transmitting suppressor 12 electrically coupled between the first antenna 10 and the first RF processing unit 11, a second antenna 20, a first isolation detector 21 electrically coupled to the second antenna 20, and a control unit 30 electrically coupled between the first transmitting suppressor 12 and the first isolation detector 21. The first RF processing unit 11 generates a first RF signal, which may be amplified by a power amplifier (PA) placed between the first RF processing unit 11 and the first transmitting suppressor 12. It is noted that "the first RF signal" referred to in the description hereinbelow has already undergone power amplification by the power amplifier (PA). The first transmitting suppressor 12 is able to transmit the first RF signal to the first antenna 10, which radiates that the first RF signal. The second antenna 20 is able to receive that the first RF signal and passes the first RF signal to the first isolation detector 21, which measures a first isolation value representing the isolation between the first and second antennae 10, 20 with respect to the first RF signal. The first isolation value is then provided to the control unit 30, which controls the first transmitting suppressor 12 with reference to the first isolation value.

Figure 3:
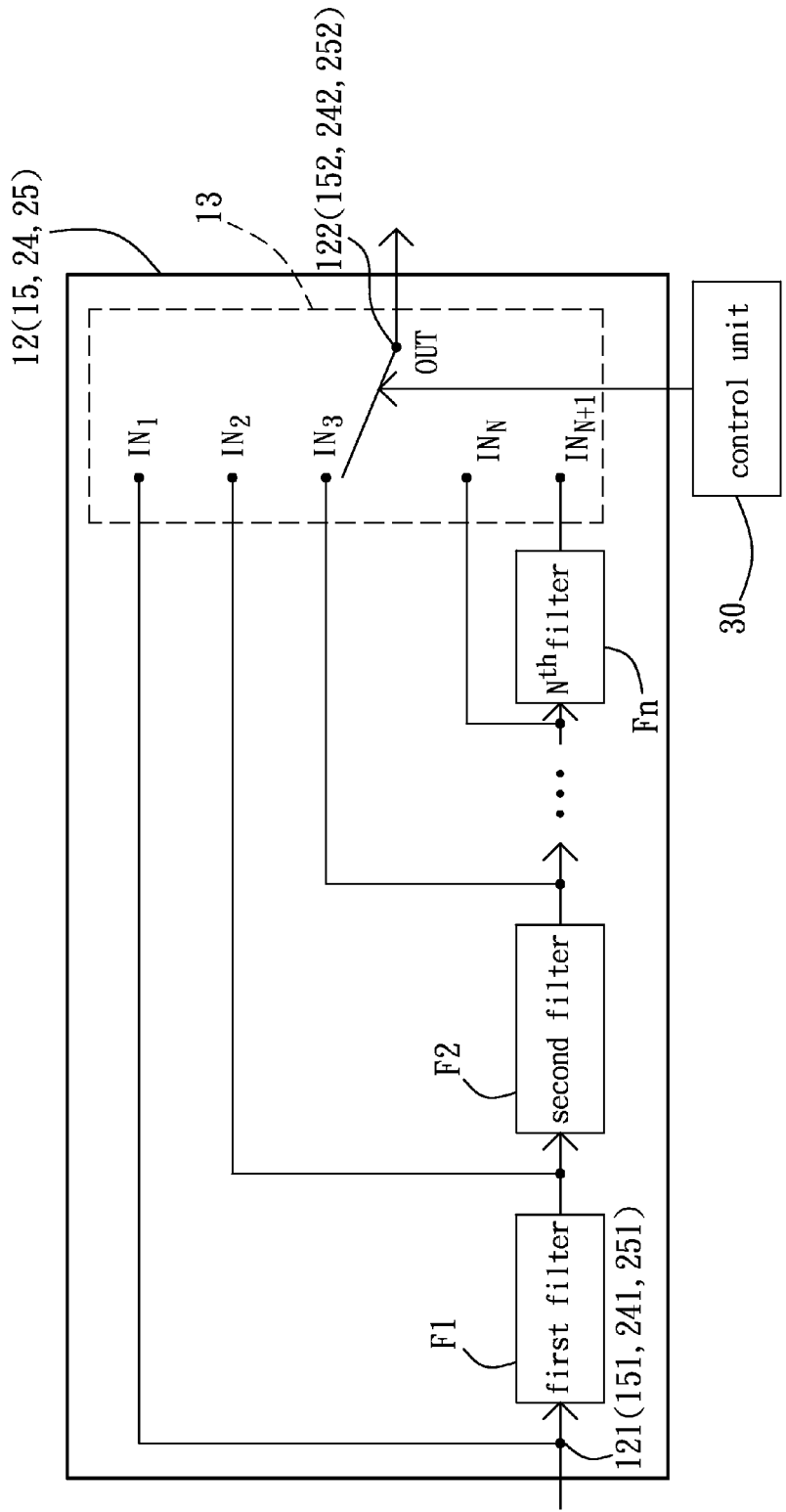
FIG. 3 is a schematic block diagram depicting a first transmitting suppressor of the RF circuit system according to the first embodiment.

As shown in FIG. 3, the first transmitting suppressor 12 has an input terminal 121 and an output terminal 122, and includes a plurality of, or specifically N number of, serially connected filters (F1~Fn) and a selector 13. The input terminal 121 of the first transmitting suppressor 12 is electrically coupled to the power amplifier (PA) so as to receive the first RF signal from the first RF processing unit 11. The selector 13 has a plurality of, or specifically N+1 number of, input contacts ($IN_1$~$IN_{n+1}$), one of which is electrically coupled to the input terminal 121 and the input node of the filter (F1) and the remainder of which are electrically and respectively coupled to the output nodes of the filters (F1~Fn). The selector 13 also has an output contact (OUT) that is electrically coupled to the first antenna 10, and that serves as the output terminal 122 of the first transmitting suppressor 12. Each of the filters (F1~Fn) can be of any type, including a band-pass filter, a low-pass filter, a high-pass filter, or a band-stop filter, to be used as necessary. The filters (F1~Fn) are for filtering the first RF signal received at the input terminal 121 to generate a plurality of different first suppressed RF signals respectively at the output nodes of the filters (F1~Fn). With the selector 13, the first transmitting suppressor 12 is able to output one of the first RF signal and the first suppressed RF signals for subsequent transmission by the first antenna 10. When the first transmitting suppressor 12 is in a default state (or an initial state), the input contact ($IN_1$) of the selector 13 (and thus the input terminal 121 of the first transmitting suppressor 12) and the output contact (OUT) of the selector 13 are electrically coupled. This allows the first RF signal to pass through the first transmitting suppressor 12 unfiltered.

When the RF circuit system is installed within a portable wireless device, the distance between the first antenna 10 and the second antenna 20 is limited by the limited internal space of the portable wireless device. Thus, it is likely for the isolation between the first and second antennae 10, 20 to be insufficient to prevent interference.

When an RF signal is generated, the signal is not limited to the intended frequency range, but extends out of the intended frequency range into what are known as side lobes, usually at lower power levels than the main lobe signal. Thus, when the operating bands of the first antenna 10 and the second antenna 20 are close to one another, the side lobes of the first RF signal could fall within the operating band of the second antenna 20, interfering with signals received by the second antenna 20.

Figure 4:
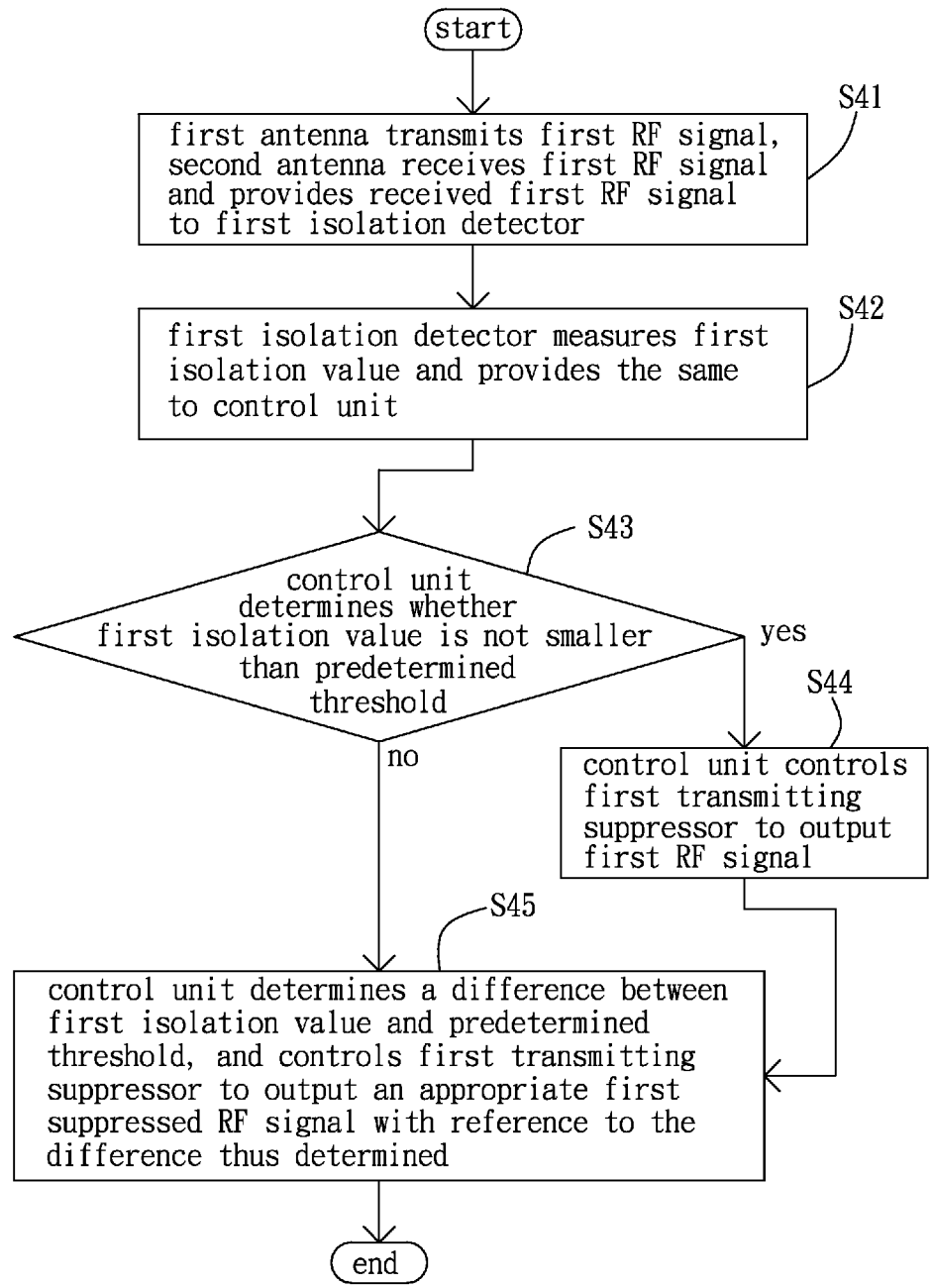
FIG. 4 is a flow chart illustrating the method for increasing the isolation between two wireless communications standards within an RF circuit system according to the first embodiment.

FIG. 4 provides a method to ensure a sufficient degree of isolation between the first antenna 10 and the second antenna 20 so as to prevent the side lobes of the first RF signal from interfering with the reception ability of the second antenna 20. In step S41, before the first RF processing unit 11 generates the first RF signal, the control unit 30 is configured to control the first transmitting suppressor 12 to operate in the default state (such that the input terminal 121 and the output contact (OUT) are electrically coupled). The first RF processing unit 11 then generates the first RF signal and sends the first RF signal through the first transmitting suppressor 12 to the first antenna 10, which subsequently transmits the first RF signal. The second antenna 20 then receives the first RF signal and transmits the first RF signal thus received to the first isolation detector 21. In step S42, the first isolation detector 21 is configured to measure a first isolation value representing the isolation between the first antenna 10 and the second antenna 20 with respect to the first RF signal, and provides the first isolation value to the control unit 30.

The first isolation value varies based on the power in the side lobes. When the power in the side lobes of the first RF signal is small, the first isolation value is large, and vice versa. For example, if the first antenna 10 transmits the first RF signal with a transmission power of 1 W and the first RF signal received by the second antenna 20 has a side lobe power of 0.001 W, the first isolation value between the first and second antennae 10, 20 will be measured at 10 log(1/0.001)=30 dB. But if the side lobe power was 0.0001 W, the first isolation value would be 10 log(1/0.0001)=40 dB.

Next, in step S43, upon receipt of the first isolation value from the first isolation detector 21, the control unit 30 is configured to determine whether the first isolation value is not smaller than a predetermined threshold. If it is determined that the first isolation value is not smaller than, i.e., greater than or equal to, the predetermined threshold, then there is sufficient isolation between the first antenna 10 and the second antenna 20 with respect to the first RF signal. This means that the side lobes of the first RF signal transmitted by the first antenna 10 did not substantially interfere with operation of the second antenna 20 so no filtering in the first transmitting suppressor 12 is necessary for the first RF signal to ensure sufficient isolation between the first and second antennae 10, 20. Accordingly, the process goes to step S44, in which the control unit 30 is configured to control the first transmitting suppressor 12 to maintain the default state (keeping the input terminal 121 electrically coupled to the output contact (OUT)) so that the first RF signal subsequently outputted from the first RF processing unit 11 will pass directly through the first transmitting suppressor 12 to the first antenna 10 without being filtered by any of the filters (F1~Fn) of the first transmitting suppressor 12. On the other hand, if it is determined by the control unit 30 that the first isolation value is smaller than the predetermined threshold (meaning that the side lobes of the first RF signal transmitted by the first antenna 10 could interfere with operation of the second antenna 20), then the process goes to step S45, where the control unit 30 is configured to determine a difference between the first isolation value and the predetermined threshold, and to control the first transmitting suppressor 12 to output the first suppressed RF signal at the output node of one of the filters (F1~Fn) as determined by the control unit 30 with reference to the difference between the first isolation value and the predetermined threshold. That is to say, the control unit 30 controls the selector of the first transmitting suppressor 12 to electrically couple an appropriate one of the input contacts ($IN_2$~$IN_{n+1}$) corresponding to the output node of said one of the filters (F1~Fn) to the output contact (OUT) so that the output of said one of the filters (F1~Fn) will be transmitted to the first antenna 10.

For example, it is supposed that all of the filters (F1~Fn) of the first transmitting suppressor 12 are filters that cut off 20 dB power from the left and right side lobes, that the first isolation value measured by the first isolation detector 21 is 40 dB, and that the predetermined threshold is 80 dB. Based on the difference of 40 dB between the measured first isolation value and the predetermined threshold, the first RF signal needs to pass through two filters to rid the RF signal of the 40 dB of power in the side lobes. This will allow the isolation to reach the predetermined threshold. Thus, the control unit 30 will control the selector 13 of the first transmitting suppressor 12 to electrically connect the output node of the second filter (F2), i.e., the input contact ($IN_3$) to the output contact (OUT) so as to allow the first suppressed RF signal, which is equivalent to the first RF signal that has undergone filtering by the first and the second filters (F1~F2), to be transmitted to the first antenna 10. This process ensures sufficient isolation between the first antenna 10 and the second antenna 20 so that signals sent from the first antenna 10 do not interfere with signals being received by the second antenna 20.

It should be noted herein that, when the relative positions of the first antenna 10 and second antenna 20 are fixed, the method depicted in FIG. 4 only needs to be performed once to determine the isolation between the first antenna 10 and the second antenna 20. If, on the other hand, the first antenna 10 or the second antenna 20 are dynamic or mobile and can change direction or position, the method of FIG. 4 can be triggered manually or timed to automatically trigger whenever the first or second antenna 10, 20 changes direction or position so as to ensure that the isolation between the first antenna 10 and the second antenna 20 with respect to the first RF signal is sufficient by making appropriate adjustments accordingly.

FIG. 5 depicts the RF circuit system according to the second embodiment of this invention, where in addition to all of the elements of the first embodiment, the RF circuit system further includes a diplexer 14 and a first receiving suppressor 15. Referring to FIG. 3, the first receiving suppressor 15 includes a plurality of serially connected filters (F1~Fn) between an input terminal 151 and an output terminal 152 thereof for filtering a second RF signal thus received to generate a plurality of different second suppressed RF signals respectively at output nodes of the filters (F1~Fn), and essentially has the same or substantially similar structure as the first transmitting suppressor 12. The first receiving suppressor 15 may have more or fewer filters than the first transmitting suppressor 12. The diplexer 14 has a first terminal (a1) electrically coupled to the first antenna 10, a second terminal (b1) electrically coupled to the output contact (OUT) of the first transmitting suppressor 12, and a third terminal (c1) electrically coupled to the input terminal 151 of the first receiving suppressor 15. The output contact (OUT), or the output terminal 151, of the first receiving suppressor 15 is electrically coupled to a low-noise amplifier (LNA), which is coupled at the other end to the first RF processing unit 11. This system allows the diplexer 14 to simultaneously pass one of the first RF signal and the first suppressed RF signals from the first transmitting suppressor 12 to the first antenna 10 for transmission and pass the second RF signal received by the first antenna 10 to the first receiving suppressor 15. The first receiving suppressor 15 would output one of the second RF signal and the second suppressed RF signals for subsequent transmission to the first RF processing unit 11 after passing through the low-noise amplifier (LNA). The diplexer 14, the first transmitting suppressor 12, the power amplifier (PA), the first receiving suppressor 15, and the low-noise amplifier (LNA) cooperatively constitute an RF module 300 that may be used for the CDMA (code division multiple access) standard. It is noted herein that the first RF signal refers to any RF signal within a first frequency band, and the second RF signal refers to any RF signal within a second frequency band.

As in the first embodiment described above, when the first antenna 10 and the second antenna 20 are physically close to each other, an RF signal transmitted by the second antenna 20 (the second RF signal) could have side lobes whose frequencies fall within the operating band of the first antenna 10. This causes interference in the first antenna 10 and adversely affects the ability of the first antenna 10 to receive signals. There are two cases that must be discussed regarding the measure to decrease the interference that the second antenna 20 would imposes on the first antenna 10 with respect to the second RF signal so as to ensure sufficient isolation between the first antenna 10 and second antenna 20 with respect to the second RF signal.

The first case is when the first RF signal and the second RF signal have similar operating bands (for example, within 120 MHz of each other). Relying on the S-parameter analysis of antennae, S12=S21, meaning that the isolation between the first and second antennae 10, when the first antenna 10 transmits a signal and the isolation between the first and second antennae 10, 20 when the first antenna 10 receives a signal will be the same or at least substantially similar. Therefore, the isolation measured as to the first RF signal can be substituted as the isolation as to the second RF signal with no need to re-measure. Therefore, with reference to the first isolation value determined by the first isolation detector 21 as discussed in the first embodiment, the control unit 30 may control the first receiving suppressor 15 similar to controlling the first transmitting suppressor 12. That is to say, when the first isolation value is not smaller than the predetermined threshold, the control unit 30 will control the first receiving suppressor 15 to directly transmit the second RF signal to the first RF processing unit 11. If the first isolation value is smaller than the predetermined threshold, then the control unit 30 will further control the first receiving suppressor 15 to output, to the first RF processing unit 11, the second suppressed RF signal generated at the output node of one of the filters (F1~Fn) as determined by the control unit 30 with reference to the difference between the first isolation value and the predetermined threshold. In other words, That is to say, the control unit 30 controls the selector 13 of the first receiving suppressor 15 to electrically couple an appropriate one of the input contacts ($IN_2$~$IN_{n+1}$) corresponding to the output node of said one of the filters (F1~Fn) to the output contact (OUT) so that the output of said one of the filters (F1~Fn) will be transmitted to the first RF processing unit 11, meaning that the second RF signal will be filtered to decrease the power in the side lobes and thus increase the isolation between the first antenna 10 and second antenna 20 with respect to the second RF signal.

Figure 6:
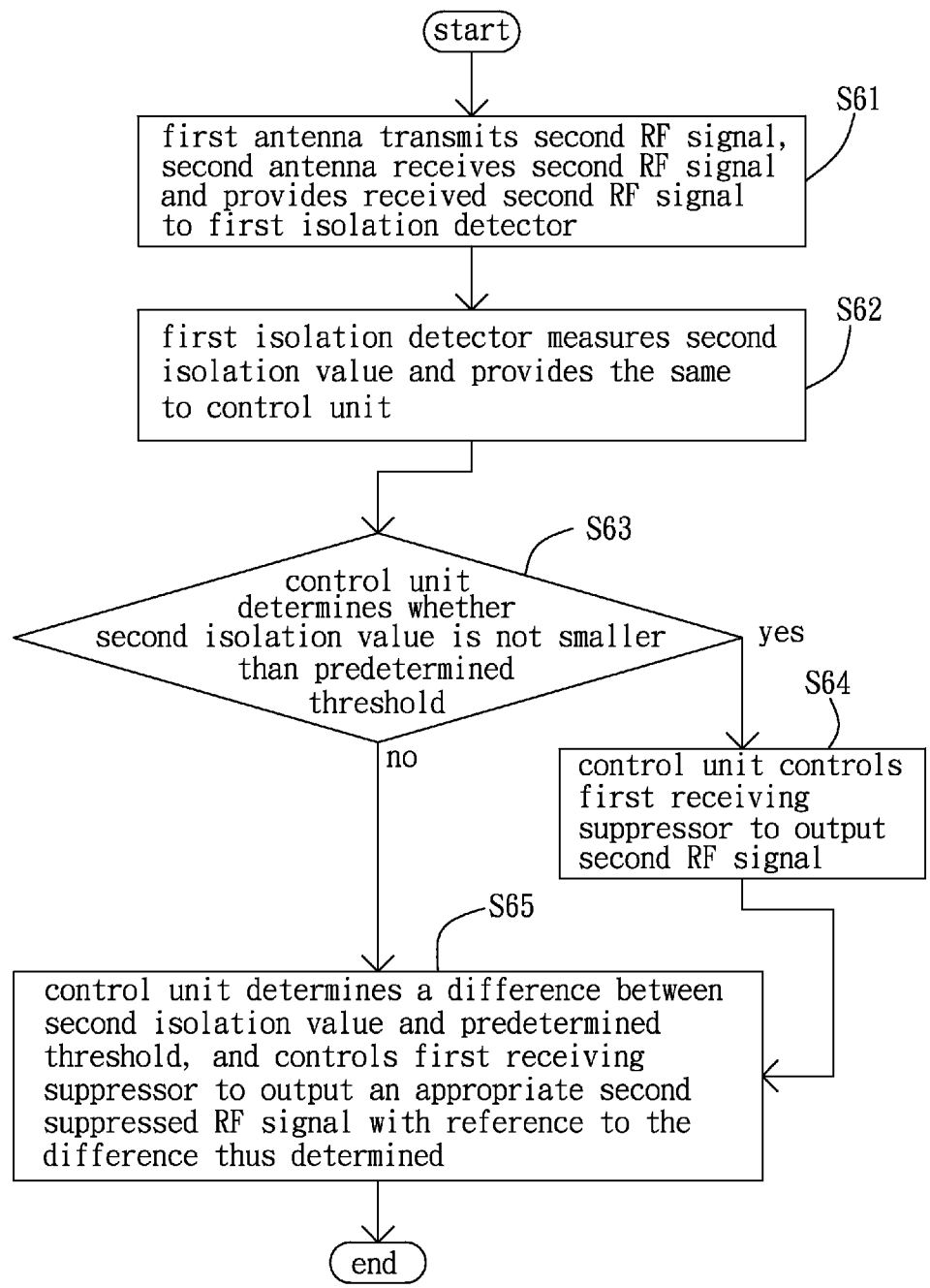
FIG. 6 is a flow chart illustrating the method for increasing the isolation between two wireless communications standards within an RF circuit system according to the second embodiment.

The second case is when the operating bands of the first RF signal and the second RF signal differ relatively large, e.g. by greater than 120 MHz. In this case, the method depicted in FIG. 6 will be performed to ensure that the isolation between the first antenna 10 and the second antenna 20 with respect to the second RF signal is not smaller than the predetermined threshold.

In step S61, the control unit 30 is configured to control the first transmitting suppressor 12 to operate at the default state, and the first RF processing unit 11 is configured to generate the second RF signal that travels directly through the first transmitting suppressor 12 and the diplexer 14 to the first antenna 10 for transmission by the first antenna 10. The second antenna 20 then receives the second RF signal and transmits the second RF signal thus received to the first isolation detector 21.

In step S62, the first isolation detector 21 is configured to measure a second isolation value representing the isolation between the first antenna 10 and the second antenna 20 with respect to the second RF signal, and provides the second isolation value to the control unit 30.

Next, in step S63, the control unit 30 is configured to determine whether the second isolation value is not smaller than a predetermined threshold (this predetermined threshold need not be the same as the predetermined threshold discussed above). If it is determined that the second isolation value is not smaller than the predetermined threshold, there is sufficient isolation between the first antenna 10 and the second antenna 20 with respect to the second RF signal, and the process goes to step S64. Otherwise, i.e., if it is determined that the second isolation value is smaller than the predetermined threshold, the process goes to step S65.

In step S64, the control unit 30 is configured to control the first receiving suppressor 15 to maintain in the default state so that the second RF signal will be directly transmit to the first RF processing unit 11 without being filtered by any of the filters (F1~Fn) of the first receiving suppressor 15.

In step S65, the control unit 30 is configured to determine a difference between the second isolation value and the predetermined threshold, and to control the first receiving suppressor 15 to output the second suppressed RF signal at the output node of one of the filters (F1~Fn) as determined by the control unit 30 with reference to the difference between the second isolation value and the predetermined threshold. That is to say, the second RF signal will pass through the appropriate number of filter(s) (F1~Fn) in the first receiving suppressor 15 so as to diminish the side lobes before reaching the first RF processing unit 11. This will increase the isolation between the first antenna 10 and the second antenna 20 so that the isolation is not smaller than the predetermined threshold.

Figure 7:
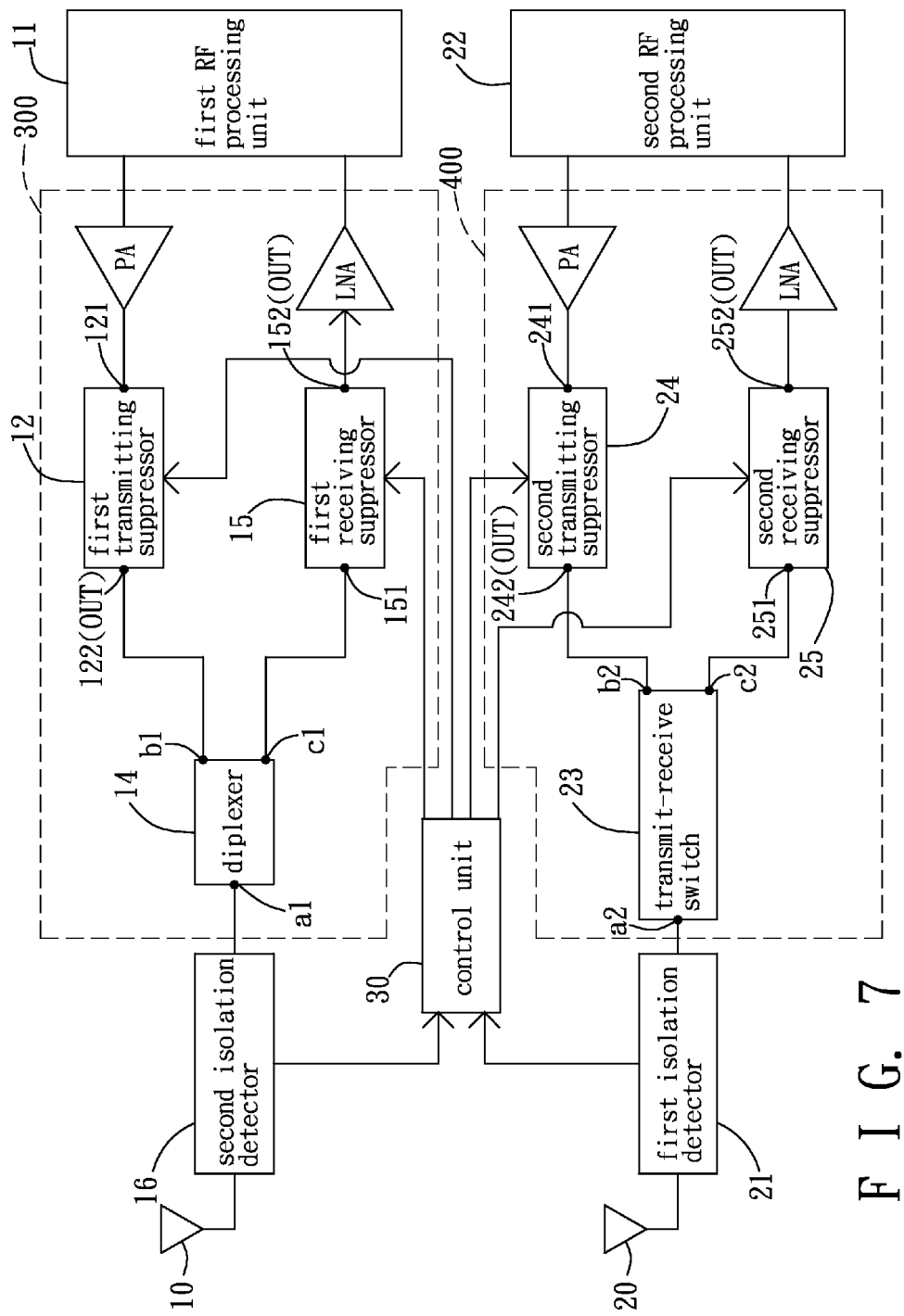
FIG. 7 is a schematic block diagram of an RF circuit system according to the third embodiment of this invention.

FIG. 7 shows the RF circuit system according to a third embodiment of this invention, including, in addition to all of the elements shown in FIG. 5, a second isolation detector 16 electrically coupled between the first antenna 10 and the diplexer 14, a transmit-receive switch 23 coupled to the first isolation detector 21, a second RF processing unit 22, a second transmitting suppressor 24 electrically coupled between the second RF processing unit 22 and the transmit-receive switch 23, and a second receiving suppressor 25 electrically coupled between the second RF processing unit 22 and the transmit-receive switch 23. The second transmitting suppressor 24 and the second receiving suppressor 25 are the same or substantially similar in structure to that used in the first transmitting suppressor 12 as shown in FIG. 3, and each has a plurality of serially-connected filters (F1~Fn) for filtering a third/fourth RF signal so as to generate a plurality of third/fourth suppressed RF signals respectively at output nodes of the filters (F1~Fn). Further details of the second transmitting suppressor 24 and the second receiving suppressor 25 are omitted herein for the sake of brevity. The transmit-receive switch 23 has a first terminal (a2) electrically coupled to the first isolation detector 21, a second terminal (b2) electrically coupled to the output contact (OUT) of the second transmitting suppressor 24, and a third terminal (c2) electrically coupled to the input terminal 251 of the second receiving suppressor 25 for selectively establishing an electrical connection between the first terminal (a2) and one of the second and third terminals (b2, c2). When the first terminal (a2) and the second terminal (b2) are electrically coupled, the second antenna 20 will be able to transmit signals. While in this configuration, the second RF processing unit 22 generates and sends the third RF signal through the second transmitting suppressor 24, a power amplifier (PA) that amplifies the third RF signal, and the transmit-receive switch 23 to the second antenna 20 for transmission. When the first terminal (a2) and the third terminal (c2) are electrically coupled, the second receiving suppressor 25 can receive signals from the second antenna 20. While in this configuration, the second antenna 20 receives a fourth RF signal, which is subsequently sent through the transmit-receive switch 23, the second receiving suppressor 25, and a low-noise amplifier (LNA) that amplifies the fourth RF signal to the second RF processing unit 22. The transmit-receive switch 23, the second transmitting suppressor 24, the power amplifier (PA), the second receiving suppressor 25, and the low-noise amplifier (LNA) cooperatively constitute an RF module 400 that could be used for the time division multiplexing (TDD) standard.

Figure 8:
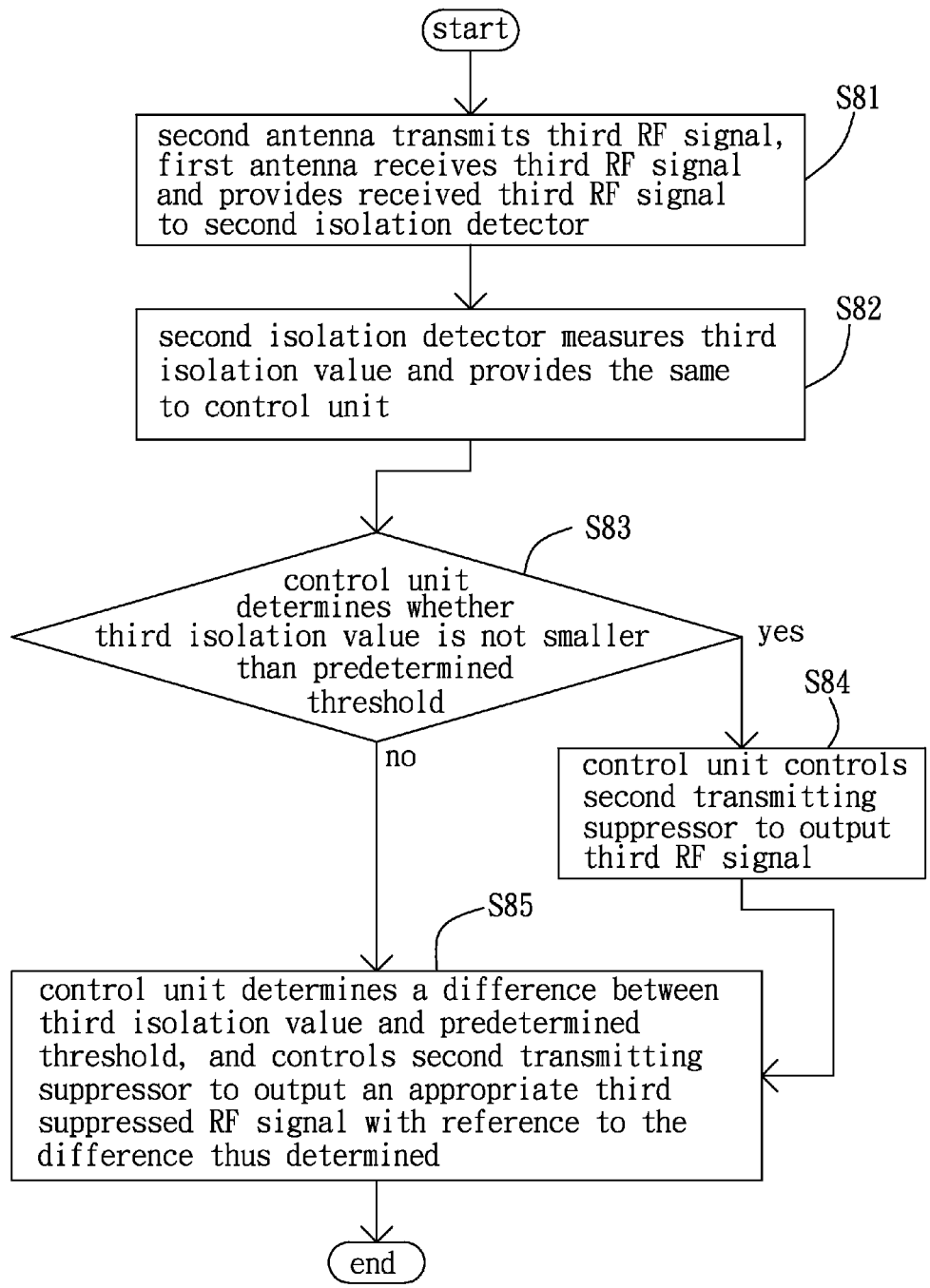
FIG. 8 is a flow chart illustrating one implementation of the method for increasing the isolation between two wireless communications standards within an RF circuit system according to the third embodiment.

In this embodiment, when the second RF processing unit 22 generates and transmits the third RF signal through the second antenna 20, the method depicted in FIG. 8 provides implemented to avoid insufficient isolation between the second antenna 20 and the first antenna 10 with respect to the third RF signal by controlling the second transmitting suppressor 241 and thus avoid interference by such transmission of the second antenna 20 on the signals received by the first antenna 10.

Similar to the methods described above, in step S81, the control unit 30 is first configured to control the second transmitting suppressor 24 to operate in the default state. Then, the second RF processing unit 22 is configured to generate the third RF signal that travels directly through the second transmitting suppressor 24, the transmit-receive switch 23, and the first isolation detector 21 to the second antenna 20 for transmission by the second antenna 20. The first antenna 10 is configured to receive the third RF signal and transmits the same to the second isolation detector 16.

In step S82, the second isolation detector 16 is configured to measure a third isolation value representing the isolation between the first and second antennae 10, 20 with respect to the third RF signal, and provides the third isolation value to the control unit 30.

In step S83, the control unit 30 is configured to determine whether the third isolation value is not smaller than a predetermined threshold (this predetermined threshold need not be the same as those in the embodiments above). If it is determined that the third isolation value is not smaller than the predetermined threshold, then process will go to step S84. Otherwise, i.e., if it is determined that the third isolation value is smaller than the predetermined threshold, the process will go to step S85.

In step S84, the control unit 30 is configured to control the second transmitting suppressor 24 to maintain the default state so that the third RF signal subsequently generated and transmitted by the second RF processing unit 22 will pass directly through the second transmitting suppressor 24 to the transmit-receive switch 23, and on to the second antenna 20, without being filtered by any of the filters (F1~Fn) of the second transmitting suppressor 24.

In step S65, the control unit 30 is configured to determine a difference between the third isolation value and the predetermined threshold, and to control the second transmitting suppressor 24 to output the third suppressed RF signal at the output node of one of the filters (F1~Fn) as determined by the control unit 30 with reference to the difference between the third isolation value and the predetermined threshold. In other words, the third RF signal will pass through the appropriate number of filter(s) (F1~Fn) in the second transmitting suppressor 24 to diminish the side lobes and thus increase the isolation between the first antenna 10 and the second antenna 20 with respect to the third RF signal so as to ensure sufficient isolation. The increased isolation diminishes the interference that the third RF signal has on the signals received by the first antenna 10.

As above, when the second antenna 20 is to receive the fourth RF signal, there are two cases to be discussed. These two cases help to increase the isolation between the first and second antennae 10, 20 and thus diminish the interference caused by the side lobes of signals transmitted by the first antenna 10 on the fourth RF signal received by the second antenna 20.

The first case is when the operating bands of the third RF signal to be transmitted by the second antenna 20 and the fourth RF signal to be received by the second antenna 20 are close, for example within 120 MHz of each other. Analogous to controlling the first receiving suppressor 15, the control unit 30 can directly use the third isolation value to control the second receiving suppressor 25, allowing the fourth RF signal to pass either directly through the second receiving suppressor 25 without being filtered or through some of the filter(s) (F1~Fn). This mechanism helps to reduce the interference on the fourth RF signal caused by signals transmitted by the first antenna 10 and also increase the isolation between the first antenna 10 and the second antenna 20 with respect to the fourth RF signal so that the isolation at least equals the predetermined threshold.

Figure 9:
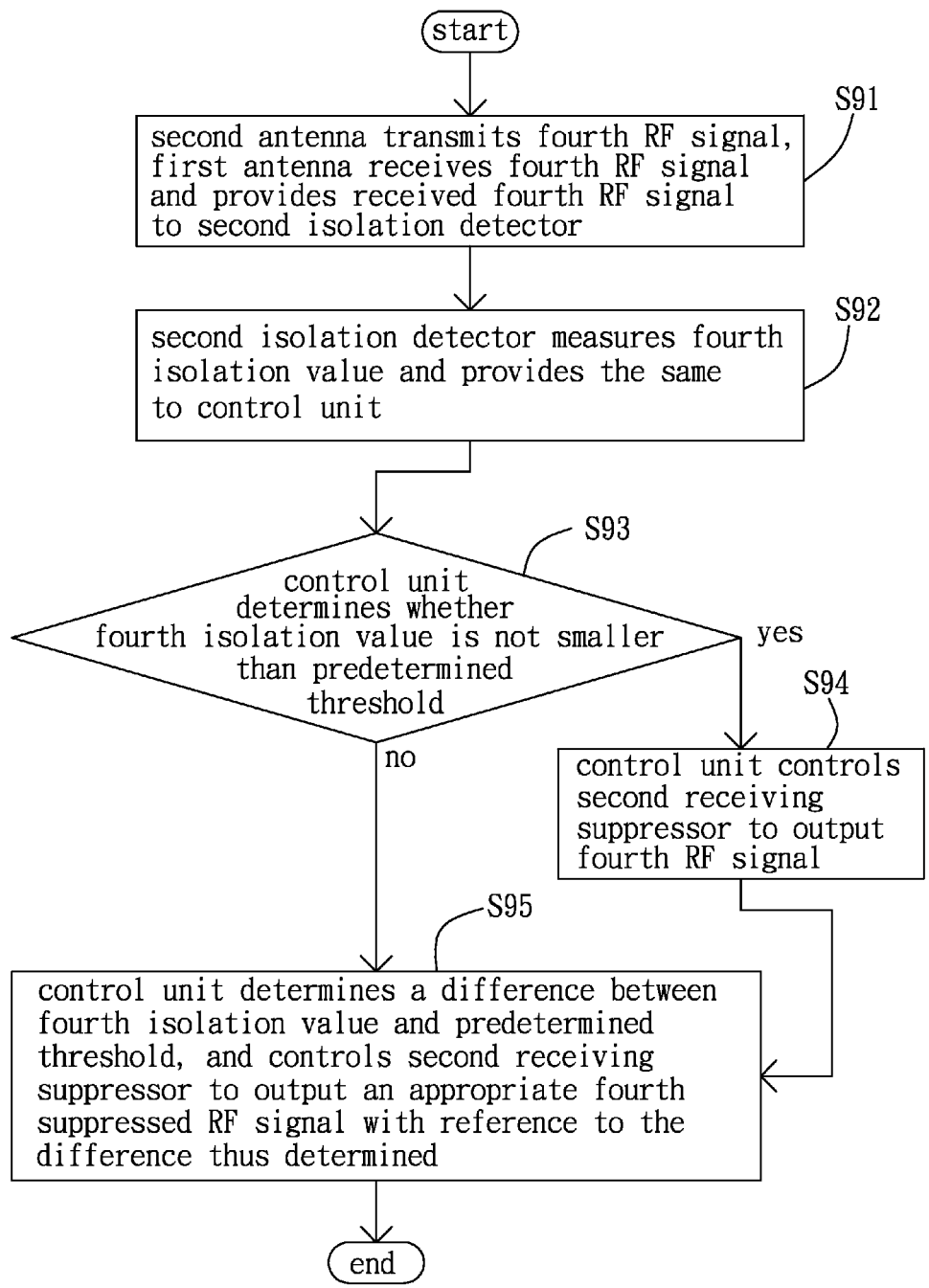
FIG. 9 is a flow chart illustrating another implementation of the method for increasing the isolation for increasing the isolation between two wireless communications standards within an RF circuit system according to the third embodiment.

The second case is when the frequencies of the third RF signal and the fourth RF signal differ relatively large, e.g. by greater than 120 MHz. In this case, the method in FIG. 9 will be used as a measure to ensure that sufficient isolation is present between the first antenna 20 and the first antenna 10 with respect to the fourth RF signal.

In step S91, the control unit 30 is configured to control the second transmitting suppressor 24 to operate at the default state, and the second RF processing unit 22 is configured to generate the fourth RF signal that passes directly through the second transmitting suppressor 24, the transmit-receive switch 23, and the first isolation detector 21 to the second antenna 20 for transmission. The first antenna 10 receives the fourth RF signal and transmits the fourth RF signal thus received to the second isolation detector 16.

In step S92, the second isolation detector 16 is configured to measure the fourth isolation value representing the isolation between the second antenna 20 and the first antenna 10 with respect to the fourth RF signal, and provides the fourth isolation value to the control unit 30.

In step S93, the control unit 30 is configured to determine whether the fourth isolation value is not smaller than a predetermined threshold (this predetermined threshold need not be the same as the predetermined threshold discussed above). If so, then the process goes to step S94. Otherwise, the process goes to step S95.

In step S94, the control unit 30 is configured to control the second receiving suppressor 25 to maintain the default state so as to allow the fourth RF signal to directly pass through without being filtered by any of the filters (F1~Fn) in the second receiving suppressor 25.

In step S65, the control unit 30 is configured to determine a difference between the fourth isolation value and the predetermined threshold, and to control the second receiving suppressor 25 to output the fourth suppressed RF signal at the output node of one of the filters (F1~Fn) as determined by the control unit 30 with reference to the difference between the fourth isolation value and the predetermined threshold. That is to say, the fourth RF signal will pass through the appropriate number of filter(s) (F1~Fn) in the second receiving suppressor 25 so as to diminish the side lobes before being passed to the second RF processing unit 22. This will increase the isolation between the first antenna 10 and second antenna 20 so that the isolation is not smaller than the predetermined threshold.

Figure 10:
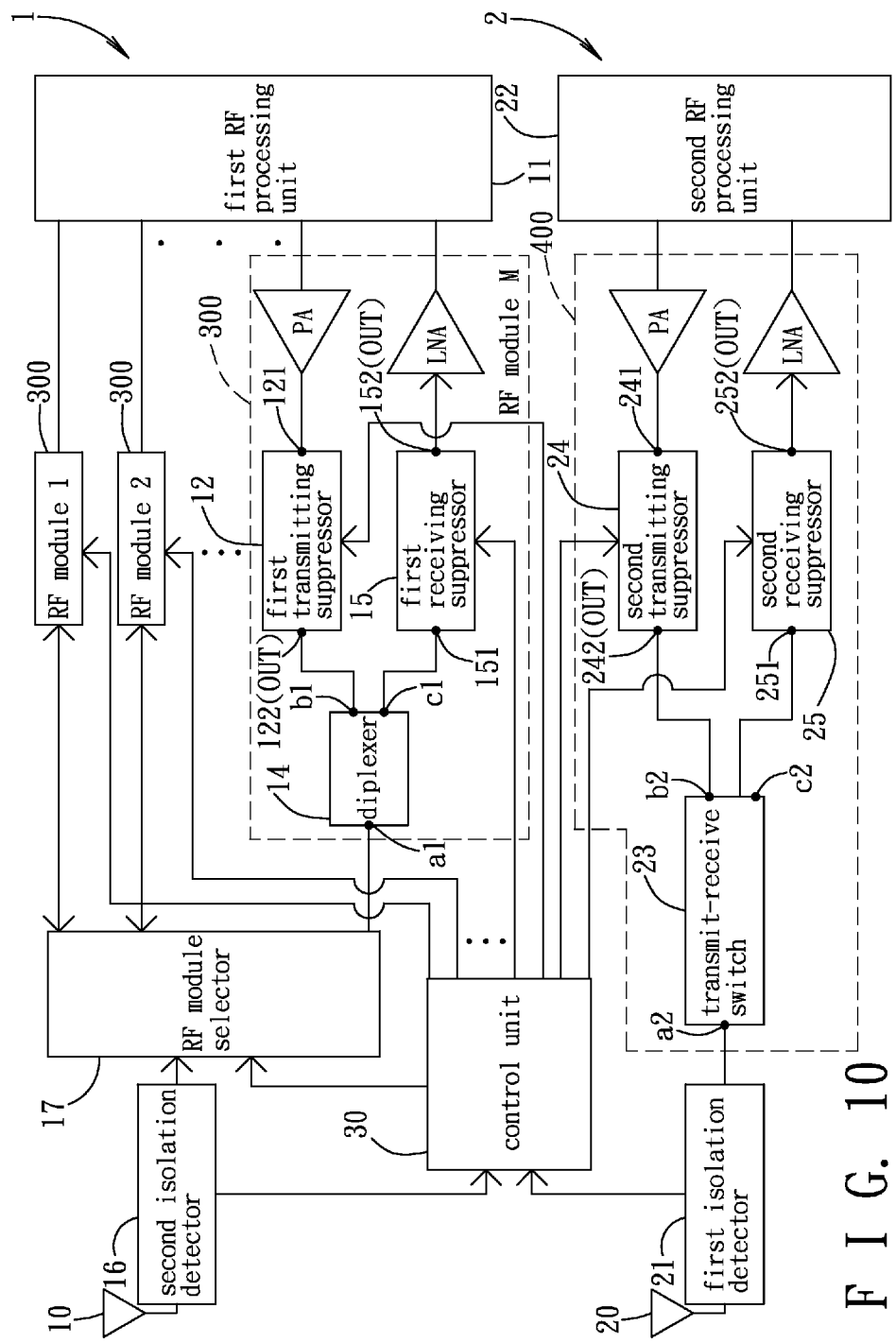
FIG. 10 is a schematic block diagram of an RF circuit system according to the fourth embodiment of this invention.

FIG. 10 depicts the RF circuit system according to a fourth embodiment of this invention. The RF circuit system includes a first communications system 1, a second communications system 2, and a control unit 30 electrically coupled between the first communications system 1 and the second communications system 2. As an example, the first communications system 1 uses the LTE (Long Term Evolution) standard and includes a first antenna 10, a second isolation detector 16, a first RF processing unit 11, M number of RF modules 300, each working in a different frequency band, and an RF module selector 17 electrically coupled between the M number of RF modules 300 and the second isolation detector 16. Each of the RF modules 300 is the same as those depicted in FIGS. 5 and 7.

The second communications system 2 uses WiFi as an example, and includes a second antenna 20, a first isolation detector 21, a second RF processing unit 22, and an RF module 400 electrically coupled between the second RF processing unit 22 and the first isolation detector 21.

Within the first communications system 1, the control unit 30 controls the RF module selector 17 to select one of the RF modules 300 for connection with the second isolation detector 16. Thus, before actual operation of the M number of RF modules 300, the control unit 30 can electrically couple the second isolation detector 16 with each of the M number of RF modules 300 in turn and following the first embodiment above (the method described in FIG. 4) and the second embodiment above (the method described in FIG. 6) to determine the isolation as to each RF module 300. Each RF module 300 would transmit a first RF signal and a second RF signal through the first antenna 10. The second antenna 20 receives each of the first RF signal and second RF signal and transmits the same to the first isolation detector 21 to determine the first isolation value and second isolation value with respect thereto. The control unit 30 then controls the first transmitting suppressor 12 and first receiving suppressor 15 in each of the RF modules 300 to appropriately filter, or not filter, subsequent signals passing therethrough so that when in practical use, there is sufficient isolation between the first antenna 10 and the second antenna 20 to protect against interference.

Of course, if the first RF signal sent and the second RF signal received via each RF module 300 were close in frequency, the process of determining the second isolation value may be avoided, and the control unit 30 may use the first isolation value to control not only the first transmitting suppressor 12, but also the first receiving suppressor 15 within each RF module 300.

At its core, according to this invention, by providing a transmission suppressor and a receiving suppressor between a first antenna and an RF processing unit, and by providing an isolation detector electrically coupled to a second antenna in close proximity to the first antenna the isolation between the first antenna and the second antenna may be measured with respect to signals received/transmitted thereby, and appropriate suppression of side lobe frequencies of the signals may be implemented to ensure that sufficient isolation is present between the two antennae so as to decrease interference between signals received/transmitted by the two antennae.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A radio frequency (RF) circuit system comprising:
a first antenna;
a first RF processing unit capable of generating a first RF signal;
a first transmitting suppressor including a plurality of serially connected filters that are electrically coupled between said first antenna and said first RF processing unit for receiving the first RF signal from said first RF processing unit and for filtering the first RF signal thus received to generate a plurality of different first suppressed RF signals respectively at output nodes of said filters, said first transmitting suppressor being capable of outputting one of the first RF signal and the first suppressed RF signals for subsequent transmission by said first antenna;
a second antenna capable of receiving the first RF signal transmitted by said first antenna;
a first isolation detector electrically coupled to said second antenna for measuring a first isolation value representing the isolation between said first and second antennae with respect to the first RF signal; and
a control unit electrically coupled to said first isolation detector and said first transmitting suppressor for receiving the first isolation value and determining whether the first isolation value is not smaller than a predetermined threshold;
wherein, when it is determined that the first isolation value is not smaller than the predetermined threshold, said control unit controls said first transmitting suppressor to subsequently output the first RF signal for transmission by said first antenna, and when it is determined that the first isolation value is smaller than the predetermined threshold, said control unit further determines a difference between the first isolation value and the predetermined threshold and controls said first transmitting suppressor to subsequently output, for transmission by said first antenna, the first suppressed RF signal generated at said output node of one of said filters of said first transmitting suppressor as determined by said control unit with reference to the difference between the first isolation value and the predetermined threshold.

2. The RF circuit system as claimed in claim 1, further comprising:
a first receiving suppressor including a plurality of serially connected filters that are electrically coupled between said first antenna and said first RF processing unit for receiving a second RF signal received by said first antenna, and for filtering the second RF signal thus received to generate a plurality of different second suppressed RF signals respectively at output nodes of said filters, said first receiving suppressor being capable of outputting one of the second RF signal and the second suppressed RF signals to said first RF processing unit, the second RF signal differing from the first RF signal in frequency by no greater than 120 MHz;
wherein, said control unit is further electrically coupled to said first receiving suppressor; and
wherein, when it is determined that the first isolation value is not smaller than the predetermined threshold, said control unit further controls said first receiving suppressor to subsequently output the second RF signal to said first RF processing unit, and when it is determined that the first isolation value is smaller than the predetermined threshold, said control unit further controls said first receiving suppressor to subsequently output to said first RF processing unit the second suppressed RF signal generated at said output node of one of said filters of said first receiving suppressor as determined by said control unit with reference to the difference between the first isolation value and the predetermined threshold.

3. The RF circuit system as claimed in claim 1, further comprising a first receiving suppressor including a plurality of serially connected filters that are electrically coupled between said first antenna and said first RF processing unit for receiving a second RF signal received by said first antenna, and for filtering the second RF signal thus received to generate a plurality of different second suppressed RF signals respectively at output nodes of said filters, said first receiving suppressor being capable of outputting one of the second RF signal and the second suppressed RF signals to said first RF processing unit;

wherein said first RF processing unit is further capable of generating the second RF signal and transmitting the second RF signal to said first transmitting suppressor so as to be outputted to said first antenna for transmission by said first antenna;

wherein said second antenna is further capable of receiving the second RF signal transmitted by said first antenna, and said first isolation detector further measures a second isolation value representing the isolation between said first and second antennae with respect to the second RF signal;

wherein said control unit is further electrically coupled to said first receiving suppressor, further receives the second isolation value from said first isolation detector, and further determines whether the second isolation value is not smaller than the predetermined threshold; and wherein, when it is determined that the second isolation value is not smaller than the predetermined threshold, said control unit controls said first receiving suppressor to subsequently output the second RF signal to said first RF processing unit, and when it is determined that the second isolation value is smaller than the predetermined threshold, said control unit further determines a difference between the second isolation value and the predetermined threshold and controls said first receiving suppressor to subsequently output to said first RF processing unit the second suppressed RF signal generated at said output node of one of said filters of said first receiving suppressor as determined by said control unit with reference to the difference between the second isolation value and the predetermined threshold.

4. The RF circuit system as claimed in claim 3, further comprising:

a diplexer having a first terminal electrically coupled to said first antenna, a second terminal electrically coupled to said first transmitting suppressor, and a third terminal electrically coupled to said first receiving suppressor for simultaneously passing one of the first RF signal and the first suppressed RF signals from said first transmitting suppressor to said first antenna and passing the second RF signal from said first antenna to said first receiving suppressor.

5. The RF circuit system as claimed in claim 4, further comprising:

a second isolation detector electrically coupled between said first antenna and said diplexer;

a second RF processing unit capable of generating a third RF signal; and a second transmitting suppressor including a plurality of serially connected filters that are electrically coupled between said second RF processing unit and said first isolation detector for receiving the third RF signal from said second RF processing unit and for filtering the third RF signal thus received to generate a plurality of different third suppressed RF signals respectively at output nodes of said filters, said second transmitting suppressor being capable of outputting one of the third RF signal and the third suppressed RF signals for subsequent transmission by said second antenna;

wherein said first antenna is capable of receiving the third RF signal transmitted by said second antenna;

wherein said second isolation detector measures a third isolation value representing the isolation between the first and second antennae with respect to the third RF signal;

wherein said control unit is further electrically coupled to said second transmitting suppressor, further receives the third isolation value from said second isolation detector, and further determines whether the third isolation value is not smaller than the predetermined threshold; and wherein, when it is determined that the third isolation value is not smaller than the predetermined threshold, said control unit controls said second transmitting suppressor to subsequently output the third RF signal for transmission by said second antenna, and when it is determined that the third isolation value is smaller than the predetermined threshold, said control unit further determines a difference between the third isolation value and the predetermined threshold and controls said second transmitting suppressor to subsequently output, for transmission by said second antenna, the third suppressed RF signal generated at said output node of one of said filters of said second transmitting suppressor as determined by said control unit with reference to the difference between the third isolation value and the predetermined threshold.

6. The RF circuit system as claimed in claim 5, further comprising a second receiving suppressor including a plurality of serially connected filters that are electrically coupled between said first isolation detector and said second RF processing unit for receiving a fourth RF signal received by said second antenna and passed on by said first isolation detector, and for filtering the fourth RF signal thus received to generate a plurality of different fourth suppressed RF signals respectively at output nodes of said filters, said second receiving suppressor being capable of outputting one of the fourth RF signal and the fourth suppressed RF signals to said second RF processing unit, the fourth RF signal differing from the third RF signal in frequency by no greater than 120 MHz;

wherein said control unit is further electrically coupled to said second receiving suppressor; and wherein, when it is determined that the third isolation value is not smaller than the predetermined threshold, said control unit further controls said second receiving suppressor to subsequently output the fourth RF signal to said second RF processing unit, and when it is determined that the third isolation value is smaller than the predetermined threshold, said control unit further controls said second receiving suppressor to subsequently output, to said second RF processing unit, the fourth suppressed RF signal generated at said output node of one of said filters of said second receiving suppressor as determined by said control unit with reference to the difference between the third isolation value and the predetermined threshold.

7. The RF circuit system as claimed in claim 5, further comprising a second receiving suppressor including a plurality of serially connected filters that are electrically coupled between said first isolation detector and said second RF processing unit for receiving a fourth RF signal received by said second antenna and passed on by said first isolation detector, and for filtering the fourth RF signal thus received to generate a plurality of different fourth suppressed RF signals respectively at output nodes of said filters, said second receiving suppressor being capable of outputting one of the fourth RF signal and the fourth suppressed RF signals to said second RF processing unit;

wherein said second RF processing unit is further capable of generating the fourth RF signal and transmitting the fourth RF signal to said second transmitting suppressor so as to be outputted to said second antenna for subsequent transmission by said second antenna;

wherein said first antenna is capable of receiving the fourth RF signal transmitted by said second antenna, and said second isolation detector further measures a fourth isolation value representing the isolation between said first and second antennae with respect to the fourth RF signal; and wherein said control unit is further electrically coupled to said second receiving suppressor, further receives the fourth isolation value from said second isolation detector, and further determines whether the fourth isolation value is not smaller than the predetermined threshold;

wherein, when it is determined that the fourth isolation value is not smaller than the predetermined threshold, said control unit controls said second receiving suppressor to subsequently output the fourth RF signal to said second RF processing unit, and when it is determined that the fourth isolation value is smaller than the predetermined threshold, said control unit further determines a difference between the fourth isolation value and the predetermined threshold and controls said second receiving suppressor to subsequently output to said second RF processing unit the fourth suppressed RF signal generated at said output node of one of said filters of said second receiving suppressor as determined by said control unit with reference to the difference between the fourth isolation value and the predetermined threshold.

8. The RF circuit system as claimed in claim 7, further comprising a transmit-receive switch having a first terminal electrically coupled to said first isolation detector, a second terminal electrically coupled to said second transmitting suppressor, and a third terminal electrically coupled to said second receiving suppressor for selectively establishing an electrical connection between said first terminal and one of said second and third terminals.

9. The RF circuit system as recited in claim 8, wherein said diplexer, said first transmitting suppressor and said first receiving suppressor cooperatively constitute an RF module, and said RF circuit system comprises N number of said RF modules respectively operating at N number of different frequency bands, said RF circuit system further comprising an RF module selector electrically coupled to said RF modules and said second isolation detector for selectively establishing electrical connection between said second isolation detector and one of said RF modules.

10. A method for increasing isolation between two wireless communications standards within a radio frequency (RF) circuit system, the RF circuit system including a first antenna, a first RF processing unit that is capable of generating a first RF signal for subsequent transmission by the first antenna, and a second antenna capable of receiving the first RF signal, said method comprising the steps of:

(A) providing a first transmitting suppressor that includes a plurality of serially connected filters to be electrically coupled between the first antenna and the first RF processing unit for receiving the first RF signal from the first RF processing unit and for filtering the first RF signal thus received to generate a plurality of different first suppressed RF signals respectively at output nodes of the filters, and further providing a control unit to be electrically coupled to the first transmitting suppressor;

(B) providing a first isolation detector to be electrically coupled to the second antenna for measuring a first isolation value representing the isolation between the first and second antennae with respect to first RF signal, and to the control unit for providing the first isolation value to the control unit;

(C) configuring the control unit to determine whether the first isolation value is not smaller than a predetermined threshold; and (D) when it is determined that the first isolation value is not smaller than the predetermined threshold, configuring the control unit to control the first transmitting suppressor to subsequently output the first RF signal for transmission by the first antenna, and when it is determined that the first isolation value is smaller than the predetermined threshold, configuring the control unit to control the first transmitting suppressor to subsequently output, for transmission by the first antenna, the first suppressed RF signal generated at the output node of one of the filters of the first transmitting suppressor as determined by the control unit with reference to a difference between the first isolation value and the predetermined threshold.

11. The method as claimed in claim 10, further comprising the step of:

(E) providing a first receiving suppressor that includes a plurality of serially connected filters to be electrically coupled between the first RF processing unit and the first antenna for receiving a second RF signal from the first antenna and for filtering the second RF signal thus received to generate a plurality of different second suppressed RF signals respectively at output nodes of the filters, the first receiving suppressor being further coupled electrically to the control unit, the second RF signal differing from the first RF signal in frequency by no greater than 120 MHz; and wherein in step (D), when it is determined that the first isolation value is not smaller than the predetermined threshold, the control unit is further configured to control the first receiving suppressor to subsequently output the second RF signal to the first RF processing unit, and when it is determined that the first isolation value is smaller than the predetermined threshold, the control unit is further configured to control the first receiving suppressor to subsequently output, to the first RF processing unit, the second suppressed RF signal generated at the output node of one of the filters of the first receiving suppressor as determined by the control unit with reference to the difference between the first isolation value and the predetermined threshold.

12. The method as claimed in claim 10, further comprising the steps of:

(E) providing a first receiving suppressor that includes a plurality of serially connected filters to be electrically coupled between the first RF processing unit and the first antenna for receiving a second RF signal from the first antenna and for filtering the second RF signal thus received to generate a plurality of different second suppressed RF signals respectively at output nodes of the filters, the first receiving suppressor being further coupled electrically to the control unit, the first RF processing unit being capable of generating the second RF signal and transmitting the second RF signal to the first transmitting suppressor so as to be outputted to the first antenna for transmission by the first antenna, the second antenna being further capable of receiving the second RF signal;

(F) configuring the first isolation detector to further measure a second isolation value representing the isolation between the first and second antennae with respect to the second RF signal and to provide the second isolation value to the control unit;

(G) configuring the control unit to further determine whether the second isolation value is not smaller than the predetermined threshold; and (H) when it is determined that the second isolation value is not smaller than the predetermined threshold, configuring the control unit to control the first receiving suppressor to subsequently output the second RF signal to the first RF processing unit, and when it is determined that the second isolation value is smaller than the predetermined threshold, configuring the control unit to control the first receiving suppressor to subsequently output to the first RF processing unit the second suppressed RF signal generated at the output node of one of the filters of the first receiving suppressor as determined by the control unit with reference to a difference between the second isolation value and the predetermined threshold.

13. The method as claimed in claim 12, the RF circuit system further including a second RF processing unit that is capable of generating a third RF signal for subsequent transmission by the second antenna, said method further comprising the steps of:

(I) providing a second isolation detector to be electrically coupled to the first antenna, and providing a second transmitting suppressor to be electrically coupled to the control unit and including a plurality of serially connected filters to be electrically coupled between the second RF processing unit and the first isolation detector for receiving the third RF signal from the second RF processing unit and for filtering the third RF signal thus received to generate a plurality of different third suppressed RF signals respectively at output nodes of the filters, the first antenna being capable of receiving the third RF signal transmitted by the second antenna;

(J) configuring the second isolation detector to measure a third isolation value representing the isolation between the first and second antennae with respect to the third RF signal, and to provide the third isolation value to the control unit;

(K) configuring the control unit to determine whether the third isolation value is not smaller than the predetermined threshold; and (L) when it is determined that the third isolation value is not smaller than the predetermined threshold, configuring the control unit to control the second transmitting suppressor to subsequently output the third RF signal for transmission by the second antenna, and when it is determined that the third isolation value is smaller than the predetermined threshold, configuring the control unit to control the second transmitting suppressor to subsequently output, for transmission by the second antenna, the third suppressed RF signal generated at the output node of one of the filters of the second transmitting suppressor as determined by the control unit with reference to the difference between the third isolation value and the predetermined threshold.

14. The method as claimed in claim 13, further comprising the step of:

(M) providing a second receiving including a plurality of serially connected filters to be electrically coupled between the second RF processing unit and the second isolation detector for receiving a fourth RF signal received by the second antenna and for filtering the fourth RF signal thus received to generate a plurality of different fourth suppressed RF signals respectively at output nodes of the filters, the second receiving suppressor being further coupled electrically to the control unit, the fourth RF signal differing from the third RF signal in frequency by no greater than 120 MHz; and wherein in step (L), when it is determined that the third isolation value is not smaller than the predetermined threshold, the control unit is further configured to control the second receiving suppressor to subsequently output the fourth RF signal to the second RF processing unit, and when it is determined that the third isolation value is smaller than the predetermined threshold, the control unit is further configured to control the second receiving suppressor to subsequently output, to the second RF processing unit, the fourth suppressed RF signal generated at the output node of one of the filters of the second receiving suppressor as determined by the control unit with reference to the difference between the third isolation value and the predetermined threshold.

15. The method as claimed in claim 13, further comprising the steps of:

(M) providing a second receiving suppressor that includes a plurality of serially connected filters to be electrically coupled between the first isolation detector and the second RF processing unit for receiving a fourth RF signal received by the second antenna and for filtering the fourth RF signal thus received to generate a plurality of different fourth suppressed RF signals respectively at output nodes of the filters, the second receiving suppressor being further coupled electrically to the control unit, the second RF processing unit being capable of generating the fourth RF signal and transmitting the fourth RF signal to the second transmitting suppressor so as to be outputted to the second antenna for transmission by the second antenna, the first antenna being further capable of receiving the fourth RF signal;

(N) configuring the second isolation detector to further measure a fourth isolation value representing the isolation between the first and second antennae with respect to the fourth RF signal and to provide the fourth isolation value to the control unit;

(O) configuring the control unit to further determine whether the fourth isolation value is not smaller than the predetermined threshold; and (P) when it is determined that the fourth isolation value is not smaller than the predetermined threshold, configuring the control unit to control the second receiving suppressor to subsequently output the fourth RF signal to the second RF processing unit, and when it is determined that the fourth isolation value is smaller than the predetermined threshold, configuring the control unit to control the second receiving suppressor to subsequently output to the second RF processing unit the fourth suppressed RF signal generated at the output node of one of the filters of the second receiving suppressor as determined by the control unit with reference to a difference between the fourth isolation value and the predetermined threshold.

* * * * *